United States Patent [19]
Kerner

[11] Patent Number: 5,116,432
[45] Date of Patent: May 26, 1992

[54] PROCESSING METHOD FOR THE MANUFACTURING OF ELECTRONIC COMPONENTS USING A SOFT SOLDERING FLUX BASED ON CARBOXYLIC ACID

[76] Inventor: Rudolf A. Kerner, Josef-Kreitmeir-Str. 12, Tandern, Fed. Rep. of Germany, D-8893

[21] Appl. No.: 499,401

[22] PCT Filed: Jan. 12, 1988

[86] PCT No.: PCT/EP88/00017
§ 371 Date: Feb. 5, 1990
§ 102(e) Date: Feb. 5, 1990

[87] PCT Pub. No.: WO89/06584
PCT Pub. Date: Jul. 27, 1989

[51] Int. Cl.$^5$ .............................. B23K 35/34
[52] U.S. Cl. ........................ 148/23; 148/24; 148/25
[58] Field of Search ..................... 148/23-25

[56] References Cited

U.S. PATENT DOCUMENTS

| | | | |
|---|---|---|---|
| 3,734,791 | 5/1973 | Poliak | 148/25 |
| 4,342,607 | 8/1982 | Zado | 148/23 |
| 4,988,395 | 1/1991 | Taguchi | 148/23 |

FOREIGN PATENT DOCUMENTS

WO86/00844 2/1986 European Pat. Off.

Primary Examiner—Peter D. Rosenberg
Attorney, Agent, or Firm—Darby & Darby

[57] ABSTRACT

A soft soldering flux based on organic carboxylic acids is particularly suitable for the production of electronic and electrical components. Its reduced solids content (e.g. 6%) makes it specially suited to SMT manufacturing and in-circuit tests. To this end, alkylfluorinated alcohols of formula Rf—CH$_2$—CH$_2$—OH, alicyclic and aromatic mono-, di-, or polycarboxylic acids with at least one carbon ring or their derivatives are introduced, using aliphatic mono-, di, poly-, keto- or hydroxy carboxylic acids and quaternary ammonium salts.

16 Claims, No Drawings

PROCESSING METHOD FOR THE MANUFACTURING OF ELECTRONIC COMPONENTS USING A SOFT SOLDERING FLUX BASED ON CARBOXYLIC ACID

This invention relates to a processing method used in the manufacturing of electrical and electronic components. This applies particularly to printed circuits equipped with components which were soft soldered by means of soldering machines and the application of a soft soldering flux based on carboxylic acid. This process is regularly used in the electric and electronic industry.

Soft soldering fluxes containing organic carboxylic acids are already known. Refer to PS EP 0 215 773 for the description of the development of this technology.

The increasing employment of in-circuit-tests and SMT-manufacturing showed, however, that a special kind of flux is required for this purpose, i.e. a flux whose residues needn't be removed after the soldering process and which, nevertheless, can offer incontestable production results when used together with any of the two manufacturing technologies specified above. This can be achieved particularly by means of fluxes which have a drastically reduced amount of solid matter contents as compared to customary ones.

This reduction in solid matter contents is preferably attained by either: cutting down substantially the amount of resins, leaving these out altogether, or substituting these by other products. In this respect, we hereby make reference to PS DE 211497, DE 2832317, DE 1608425, DE 2725701, EP 0184825, EP 090960, EP 0077622, EP 0201150, EP 0219175 and/or U.S. Pat. No. 4,419,146 respectively.

However, the considerable reduction in solid matter contents by reducing or dispensing of the resin components, respectively, diminishes the spreadability and foamability features of the fluxing agent accordingly. An attempt to counteract this negative physical effect was made; it consisted in the addition of tensides (e.g. non-ionic, anionic, cationic, amphoteric ones, etc) as spreading or foaming components, respectively. However, it was soon established that these admixtures impair the electrochemical fatigue strength.

Secondly, the soldering vapors, i.e. the hot flux residues which evaporate after the soldering of the printed circuits until these have cooled down, proved to have a somewhat too strong physiologic activity; this was due to the missing resin, which priorly served to soften this effect. Consequently, the idea was to find a similar substitute for the succinic acid which was basically responsible for the mentioned physiologic effects.

If a halide free soldering flux without any carrying agent is created, which equals the absence of resin (e.g. as described in PS EP 090960), the crystalline nature of the carboxylic acids will leave a white crystalline pattern of flux residues after soldering; this, of course, is optically unpleasant. This phenomenon is avoided (as in the past) by adding resin, although to a considerably diminished extent (see also PS EP 0184825).

If the requirements described above are taken into consideration, for a fluxing agent whose residues needn't be removed after soldering, the optimum amount of solid matter contents is 6%, for it to be adequate for in-circuit-tests and SMT manufacturing. Nevertheless, other amounts of solid matter concentration may also be accepted.

The recently developed soft soldering fluxing agent described below—which is mainly based on PS EP 0215773, offers those features required by electrochemical and production engineering.

In this respect, the use of alicyclic carboxylic acids along with the addition of alcyl-fluoric alcohols of the chemical formula $Rf-CH_2-CH_2-OH$, where $Rf$ represents a chain of 6–16 carbon atoms, was found to be an essential basis towards long-term electrochemical stability. Any type of chains may be used for the alcyl-fluoric alcohols.

Alyphatic hydroxy carboxylic acids proved to be suitable substitutes for succinic acid. The use of hydroxy carboxylic acids as flux activators is well known (e.g. PS DE 2344493, PCT SE 850029). Nevertheless, particularly citric acid, a corrosive and thermically instable agent, and tartaric acid, the latter being almost insoluble in commercial solvents, are used for the preparation of halide fluxing agents. Malic acid was found to be an excellent addition to soft halide free soldering fluxing agents whose residues need not be removed from the printed circuits after soldering. Naturally, succinic acid remains the first choice activator. The examples given below will, therefore, refer to this acid repeatedly.

It was most surprising to establish that aromatic carboxylic acids also proved to be a good choice in combination with the alicyclic carboxylic acid-alcyfluoric alcohol formula $Rf-CH_2-CH_2-OH$. Polynuclear compounds proved to be particularly suitable. Hydroxyled compounds are suitable as well. Aromatic polynuclear compounds are, for instance, naphtalene-dicarboxylic acid, naphtalene-tetracarboxylic acid, etc.

Some aromatic hydroxy carboxylic acids include: salycil-, hydroxy-naphtoe-acid, hydroxy-phenylacctic acid, etc. These examples reflect that any aromatic carboxylic acid or its derivatives may be employed, as long as they have not been converted thermically, optically or electrochemically under the influence of temperature, light or currents in the activator mixture; such conversion would have potential detrimental effects on the function of the electronic components.

The addition of alcyfluoric alcohols of the formula $Rf-CH_2-CH_2-OH$, which are not tensidic agents, represents a further alternative for any preparations deriving from PS EP 0215773. Fluxing agents may also have modified plurivalent alcohols substituting the resin components.

The invention allows for flexible application of the fluxes. Unless otherwise stated, all the percentage figures quoted hereinafter are to be interpreted as weight percentages, based on the total composition.

a) Liquid Flux

This is to be preferably used for automatic wave soldering processes; application to the circuits is to be accomplished by means of foam, sprays or similar methods.

In this case, the resin contents constitutes an amount of 0.01–35%. The suitable kinds of resins are specified in PS EP 0215773.

The modified polyhidric alcohols contain 2 to 16 carbon atoms, their isomers and derivatives, in particular their ester, ether and oxo compounds, are contained in the ratio of 0.01–90%. Examples of this are given in PS EP 0215773.

The following components of the activator system are contained in the ratio of 0.01 to 25% or 0%.

In the case of alicyclic mono-, di- or polycarboxylic acids, these have at least one carbon ring or their derivatives. The suitable kinds of alicyclic carboxylic acids are specified in PS EP 0215773.

Saturated aliphatic monocarboxylic acids contain 14 to 22 carbon atoms. Examples for suitable acids are given in PS EP 0215773.

Saturated aliphatic dicarboxylic acids have 2 to 10 carbon atoms and polycarboxylic acids. Examples of suitable acids are given in PS EP 0215773.

Aliphatic ketocarboxylic acids have 3 to 5 carbon atoms. Examples of suitable acids are given in PS EP 0215773.

Aliphatic hydroxy-carboxylic acids have 3 to 5 carbon atoms. Examples of suitable acids are: tartron-, hydroxy succinic (malic) acid, tartaric acid- and citric acid, of which hydroxysuccinic (malic) acid is particularly suitable.

Aromatic mono-, di- and poly-carboxylic acids have at least one carbon ring and their derivatives.

The acids which may be used include for instance: benzoe acids, salicyl acids, gallic acids, phenylacetic acids, amygdalic acids, cinnamon acids, phtal, terephtal, prohnite, mellophane, pyromellithe and mellite acids, naphtalyne-di- and tetra-carboxylic acids, hydroxy-naphtoe acids, etc. The salycil-, naphtalyne-di- and naphtalyne-tetracarboxylic acids and the hydroxy-naphtoe acid are to be considered, however, as first choice.

Quarternary ammonium salts have 4 to 19 carbon atoms. Examples of suitable salts are given in PS EP 0215773.

The amount of water contents equals 0.01-25%. The alcyl-fluoric alcohol components of the chemical formula Rf—CH2—CH2—OH, where Rf is a chain of 6-16 carbon atoms, amount to 0.01-4%.

However, any chain type may be considered just as suitable, although chain sections of 6-12 carbon atoms are to be counted as first choice. Water miscible alkanoles and their 2-5 carbon atoms isomers share 100% of the respective fluxing agent admixture each. Suitable alkanoles are described in PS EP 0215773.

A fine soldering paste may be also obtained by dispersing fine solder particles.

b) Solid Fluxes

This kind of product may be used to cover solder mouldings or as filling/core for solder wires.

The following examples serve to support and clarify the invention:

EXAMPLE 1

Liquid flux to be used for automatic wave soldering

| WW Gum rosin | 2.4 |
| --- | --- |
| Isopropanol | 88.0 |
| Water | 6.0 |
| Alcyl fluoric alcohol | 0.3 |
| Cyclohexanedicarboxylic acid | 0.7 |
| Succinic acid | 1.4 |
| Stearic acid | 1.0 |
| Levulinic acid | 0.3 |

EXAMPLE 2

Liquid flux for use in automatic wave soldering, a process which is particularly suitable for application in consumer electronics.

| WW Gum rosin | 2.1 |
| --- | --- |
| Isopropanol | 88.0 |
| Water | 6.0 |
| Alcyl fluoric alcohol | 0.3 |
| Cyclohexanedicarboxylic acid | 0.7 |
| Adipic acid | 0.3 |
| Hydroxysuccinic (malic) acid | 2.3 |
| Tetramethylammoniumbromide | 0.3 |

EXAMPLE 3

Liquid flux for use in automatic soldering. The flux residues left after the soldering process can be removed with water.

| Isopropanol | 60.0 |
| --- | --- |
| Modified polyhydric alcohol | 19.0 |
| Water | 7.0 |
| Alcyl fluoric alcohol | 0.3 |
| Glycol | 9.0 |
| Glutaric acid | 1.4 |
| Adipic acid | 0.3 |
| Cyclohexanedicarboxylic acid | 2.0 |

EXAMPLE 4

Solid flux for covering solder mouldings or to be used as core/filling for solder wires.

| Hydrogenated resin from trees | 84.5 |
| --- | --- |
| Alcyl fluoric alcohol | 0.3 |
| Cyclohexanedicarboxylic acid | 3.6 |
| Succinic acid | 10.0 |
| Naphtalenedicarboxylic acid | 0.2 |

All the indicated flux mixtures have satisfactorily passed the tests specified in DIN 8516 and DIN 8527, in all that concerns the requirements for corrosion resistance and electric surface resistance.

I claim:

1. A process for the manufacturing of electrical and electronic components by soft soldering performed with soft soldering machines and comprising the step of applying a soft soldering flux containing carboxylic acid and alcyl fluoric alcohols.

2. A process in accordance with claim 1 wherein the soft soldering flux basically consists of a) an activator system, b) a vehicle system and c) a solvent system.

3. A process in accordance with claim 2 wherein the vehicle system, in percent by weight of the total composition comprises 0.01 to 36% of a natural resin from trees, or of a modified natural resin from, trees or of a synthetic resin or a mixture thereof.

4. A process in accordance with claim 2 wherein the solvent system, in percent by weight of the total composition, comprises:
   a) 0.01 to 25% water;
   b) 0.01 to 4% alcyl fluoric alcohol in the structural formula Rf—CH2—CH2—OH, whereby R represents 6 to 16 carbon atoms;
   c) at least one alkanol having 2 to 5 carbon atoms and is miscible with water, or an isomer thereof, as a balance to 100%.

5. A process in accordance with claim 1 wherein the soft soldering flux contains in addition finely divided solder.

6. A soft soldering flux for use in manufacturing of electrical and electronic components which comprises carboxylic acid and alcyl fluoric alcohols.

7. The soft soldering flux in accordance with claim 6 in which said flux comprises an activator system, a vehicle system and a solvent system.

8. The soft soldering flux in accordance with claim 7 wherein said activator system comprises:
at least one alicyclic mono-, di- or poly-carboxylic acid having at least one carbon ring or their derivatives, in the amount of 0.1 to 25% by weight of the total composition of said soldering flux.

9. The soft soldering flux in accordance with to claim 7 wherein said activator system comprises:
a) at least one alicyclic mono-, di- or poly-carboxylic acid having at least one carbon ring or their derivatives;
b) at least one aliphatic monocarboxylic acid having 12 to 22 carbon atoms;
c) at least one saturated aliphatic dicarboxylic acid;
d) at least one aliphatic ketocarboxylic acid having 3 to 5 carbon atoms;
e) at least one aliphatic hydroxycarboxylic acid having 3 to 5 carbon atoms;
f) at least one aromatic mono-, di- or poly-carboxylic acid containing at least one carbon ring or their derivatives;
g) at least one quaternary ammonium salt having 4 to 19 carbon atoms; and
wherein the components (a), (b), (c), (d), (e), (f) and (g) are present in the amount of 0.1 to 25% by weight of the total composition of said soldering flux.

10. The soft soldering flux in accordance with claim 6 wherein said vehicle system comprises: 0.01 to 36% of a natural resin selected from the group consisting of trees, modified natural resin from trees, a synthetic resin, and a mixture thereof.

11. The soft soldering flux in accordance with claim 6 wherein said vehicle system comprises: 0.01 to 36% of a natural resin selected from the group consisting of trees, modified natural resin from trees, a synthetic resin, and a mixture thereof; and 0.01 to 90% of modified polyhydric alcohols with 2 to 16 carbon atoms or their derivatives.

12. The soft soldering flux in accordance with claim 7 wherein the solvent system comprises in percent by weight of the total composition:
a) 0.01 to 25% water;
b) 0.01 to 4% alcyl fluoric alcohol of the structural formula Rf—$CH_2$—$CH_2$—OH, whereby R is 6 to 16 carbon atoms; and
c) at least one alkanol having 2 to 5 carbon atoms which is miscible with water or an isomer thereof.

13. The soft soldering flux in accordance with claim 6 further comprising a finely divided solder.

14. The soft solder flux in accordance with claim 8 wherein the soft soldering flux is used as a cover for solder moulds.

15. The soft solder flux in accordance with claim 6 wherein the soft soldering flux is used as a filler in solder wire.

16. A process in accordance with claim 2 wherein the vehicle system, in percent by weight of the total composition, comprises 0.01 to 90% modified polyhydric alcohols with 2 to 16 carbon atoms or their derivatives.

* * * * *